Oct. 24, 1950     C. L. UNDERWOOD     2,526,713
APPARATUS FOR TESTING REFRIGERATION CONTROLS
Filed March 20, 1945     2 Sheets-Sheet 1

INVENTOR.
CLOYD L. UNDERWOOD
BY
Ralph L Chappell
ATTORNEY.

Oct. 24, 1950     C. L. UNDERWOOD     2,526,713
APPARATUS FOR TESTING REFRIGERATION CONTROLS

Filed March 20, 1945     2 Sheets-Sheet 2

INVENTOR.
CLOYD L. UNDERWOOD
BY
Ralph L. Chappell
ATTORNEY.

Patented Oct. 24, 1950

2,526,713

UNITED STATES PATENT OFFICE 2,526,713

APPARATUS FOR TESTING REFRIGERATION CONTROLS

Cloyd L. Underwood, La Mesa, Calif.

Application March 20, 1945, Serial No. 583,828

2 Claims. (Cl. 73—1)

(Granted under the act of March 3, 1883, as amended April 30, 1928; 370 O. G. 757)

This invention relates to an apparatus for testing refrigeration controls, either of the electric type or of the thermo-expansion type.

I have frequently observed a need for an apparatus that would determine the exact temperature at which a refrigeration control would function to start operation or stop operation of a mechanical regrigerator. It is desirable to ascertain these temperatures in order to know the temperature at which the refrigerator compartment will be maintained and to be able to adjust the control so that the proper temperature will be maintained at all times.

It is therefore, an object of my invention to provide an apparatus which may be used to determine the temperature at which a refrigeration control will function to start operation or stop operation of a mechanical refrigerator.

It is a further object of my invention to provide an apparatus which may be used for testing refrigeration controls of both the electric and the thermo-expansion type.

It is a further object of my invention to provide an apparatus which positively indicates the instant the control will function and shows the temperature at this instant.

It is a further object of my invention to provide an apparatus of the type mentioned above which may be compactly housed in a convenient sized cabinet.

The manner in which I have accomplished these and other objects of my invention will become apparent upon a study of the specification and drawing wherein.

Figure 1:
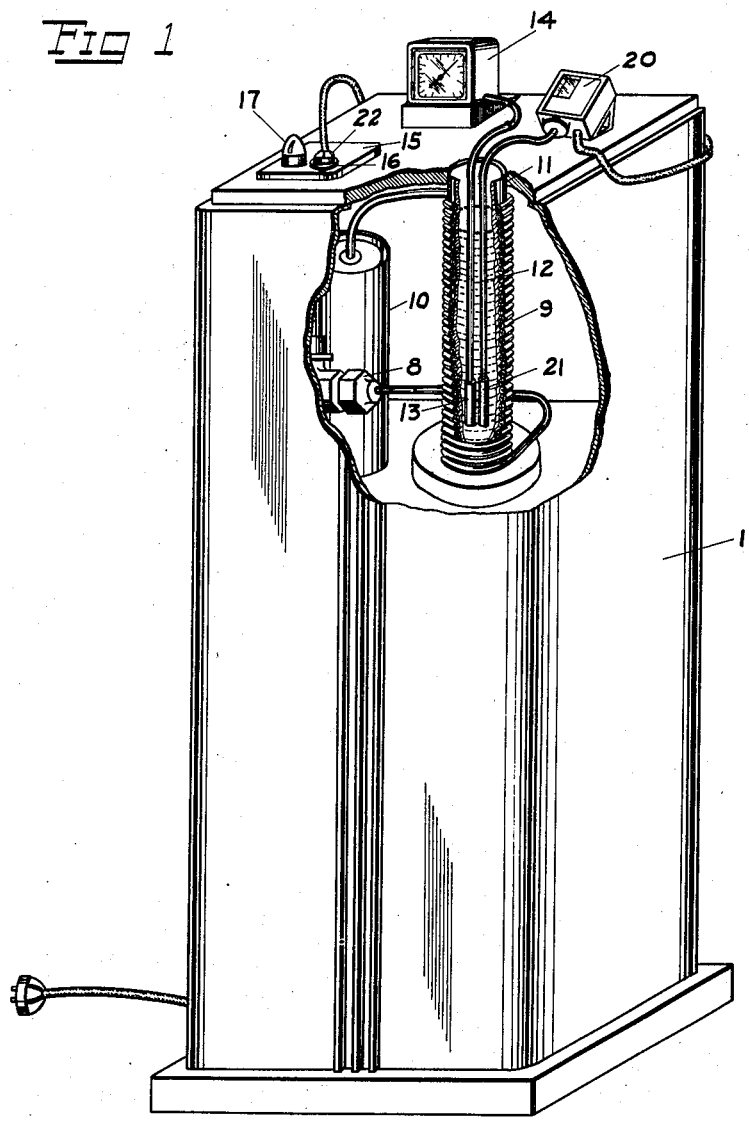
Fig. 1 shows a perspective view of my apparatus with parts broken away to better illustrate the structure.

Referring to the drawing:

The apparatus is preferably housed in a suitable cabinet 1. In the lower portion of the cabinet I provide electrically operated refrigeration means. In the form illustrated the refrigeration means comprises a motor 2 which operates a compressor 3. The compressor pumps refrigerant through a condenser 4 into a cylindrical tank 5, a high side valve 6, a dehydrator 7, an expansion valve 8, through a coil 9 into a heat exchanger 10 from which the refrigerant is returned to the compressor. The specific refrigeration means employed is not a part of my invention; hence, I have not shown it in detail. I wish it to be understood that any type of electrically operated refrigeration means may be employed in the apparatus without departing from the spirit of my invention.

In the upper portion of the cabinet 1 there is located a container 11, preferably cylindrical in shape and made of some metal that conducts heat readily. The coil 9 leading from the expansion valve is preferably wound around the container in such manner that the cool refrigerant enters at the bottom of the coil and leaves at the top thereof from which it passes into the heat exchanger 10. The container 11 is filled with a low freezing liquid 12. I have found ethyl alcohol to be satisfactory for the purpose for the reason that it is readily available, non-corrosive and has a suitable low freezing point. However, it is obvious that there are numerous other liquids suitable for this purpose.

Immersed within the liquid is the bulb 13 of a thermometer 14. For convenience, I prefer to use a dial type thermometer as illustrated in the drawing. However, it is obvious that I could use any type of thermometer that has a bulb adapted to be immersed in the liquid. The dial type thermometer 14 is preferably mounted on the top of the cabinet near the rear thereof.

There is also located on the top of the cabinet a panel 15. This panel has an electric outlet 16 and a pilot light 17.

Figure 2:
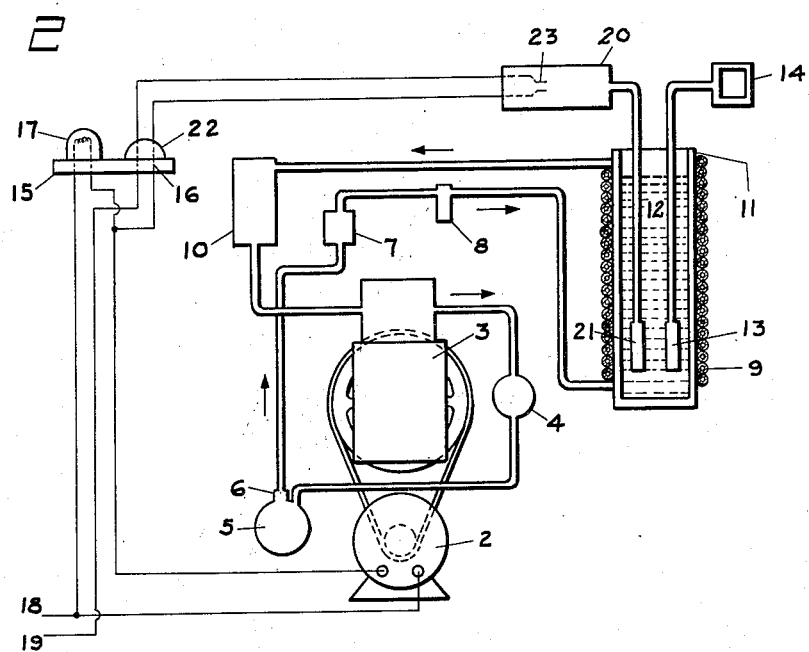
Fig. 2 shows a schematic view of the apparatus as used to test a refrigeration control of the electric type.
Figure 3:
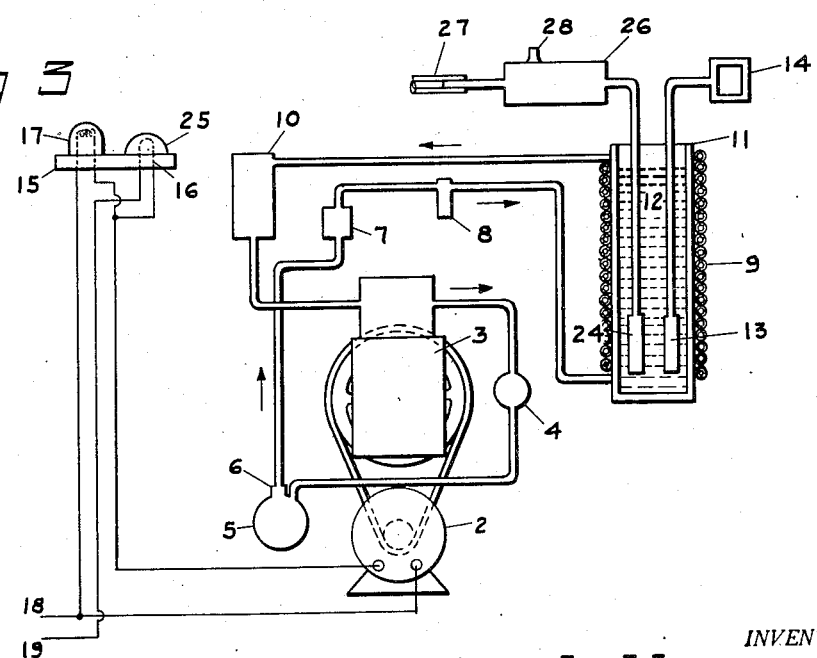
Fig. 3 shows a schematic view of the apparatus as used to test a refrigeration control of the thermo-expansion type.

The electric circuit of the apparatus is illustrated in Figs. 2 and 3. As shown in these figures, the electric circuit comprises outside leads 18 and 19. The lead 18 goes directly to the motor 2. The lead 19 goes to one side of the outlet 16; the second lead from the outlet then goes to the motor 2. The pilot light 17 is preferably connected in parallel across the leads to the motor in such manner that it lights when the motor is operating and is extinguished when the motor ceases operation. It is obvious, however, that the pilot light could be connected in series with the motor and would accomplish the same result.

Operation

When the apparatus is used to test a refrigeration control of the electric type as shown at 20 in Figs. 1 and 2, the bulb 21 of the control is immersed in the low freezing liquid and the electric plug 22 is electrically connected to the wires of the control and plugged in the outlet 16. The leads to the apparatus are connected to a suitable outside source of electrical energy.

When the connections are made with the apparatus at room temperature, the contacts 23 of the control will normally be closed to complete the circuit of the apparatus. The motor will run to operate the refrigeration means and thus pump the cooled refrigerant through the coil 9. As a result, the low freezing liquid will be cooled rapidly and its temperature will soon reach the point at which the control 20 is set to function to stop operation of a refrigerator. At this temperature the thermostat in the control opens the contacts 23 and thus breaks the circuit to the motor and extinguishes the pilot light. The temperature at which this occurs can readily be observed by noting the reading on the dial type thermometer.

After the motor stops, the temperature of the liquid rises to approach room temperature. The temperature soon reaches the point at which the thermostat in the control functions to close the contacts 23. Closing of these contacts completes the circuit to the motor and starts operation of the motor. At this time the pilot light again lights. The temperature at which this occurs can be observed by again noting the reading of the dial type thermometer.

Fig. 3 illustrates the manner of using the apparatus to test refrigeration controls of the thermo-expansion type.

Refrigeration controls of the thermo-expansion type effect control of a refrigerator by opening a valve to permit flow of a gas through the control to start operation of a refrigerator and by closing the same valve to shut off flow of the gas to stop operation of the refrigerator. Operation of the valve is governed by the temperature of a bulb 24 as shown in Fig. 3.

The electrical connection of the outlet 16 is closed by means of a short circuit plug 25. The bulb 24 of a control of the thermo-expansion type 26 is immersed in the liquid. An air line 27 is applied to the inlet of the control and a light stream of air is blown through the control. The leads 18 and 19 are connected to a suitable outside source of electrical energy. As before, the refrigerant passes through the coil 9 to cool the liquid. When the liquid is cooled to the temperature at which the control would function to stop operation of a refrigerator, the valve in the control closes. The instant of closing of the valve may be ascertained by observing the point at which the stream of air ceases to emerge from the outlet 28 of the control. The temperature at this point is noted on the thermometer.

The electric circuit is then broken by removing the plug 25 from the outlet 16. When this is done, the temperature of the liquid rises rapidly to approach room temperature. The temperature soon reaches the point at which the control would function to start operation of a refrigerator. At this time the valve in the control opens and the stream of air again passes therethrough. The point the valve opens may be determined by ascertaining when air begins to emerge from the outlet 28 of the control. The temperature at which this occurs is noted on the dial type thermometer.

From the foregoing it will be observed that I have produced an apparatus that accomplishes the objects of my invention at set forth hereinbefore. However, the structure may be varied within wide limits without departing from the spirit of my invention. I wish it to be understood that the invention is not limited to the disclosure set forth but only by the scope of the appended claims.

The invention described herein may be manufactured and used by or for the Government of the United States of America for governmental purposes without the payment of any royalties thereon or therefor.

I claim:

1. An apparatus for testing temperature responsive control switches for refrigerators comprising a container filled with low freezing liquid, electrically operated refrigerating means, a tube coiled around said container and operatively connected to said refrigerating means in such manner that the cooled refrigerant passes through the tube to cool the container and its contents, said container having an opening adapted to receive the bulb of a temperature responsive control switch under test, a thermometer, the bulb of which is immersed in said low freezing liquid, said refrigerating means having an electric motor and an electrical circuit in which said motor is connected, said electrical circuit having leads for connection to a control switch under test, whereby actuation of said motor is under control of said switch, and a pilot light operatively connected in said circuit to indicate when said refrigerating means starts and stops operation.

2. An apparatus for testing temperature responsive control means for refrigerators comprising a container adapted to receive a low freezing liquid, a thermometer having its thermal sensing portion in said container, electrically operated refrigerating means, tube means in heat transfer relationship to said container and operatively connected to said refrigerating means, an opening in said container adapted to receive the temperature responsive actuating portion of the temperature responsive control means, said refrigerating means having an electric motor and an electrical circuit connecting said motor to said temperature responsive control means thereby making the actuation of said motor dependent upon said control means, and means to indicate when said refrigerating means starts and stops.

CLOYD L. UNDERWOOD.

REFERENCES CITED

The following references are of record in the file of this patent:

UNITED STATES PATENTS

| Number | Name | Date |
|---|---|---|
| 2,026,079 | White et al. | Dec. 31, 1935 |
| 2,357,353 | Pearce | Sept. 5, 1944 |